United States Patent [19]
Pelczarski

[11] Patent Number: 4,477,047
[45] Date of Patent: Oct. 16, 1984

[54] MOUNTING MECHANISM FOR FLANGED ELECTRICAL MODULES AND THE LIKE

[75] Inventor: Walter J. Pelczarski, Downers Grove, Ill.

[73] Assignee: Allied Corporation, Morris Township, Morris County, N.J.

[21] Appl. No.: 421,639

[22] Filed: Sep. 22, 1982

[51] Int. Cl.$^3$ .............................................. A47F 5/00
[52] U.S. Cl. ................................. 248/201; 248/220.2; 248/313
[58] Field of Search ...................... 248/201, 200, 217.2, 248/220.2, 316 D, 313, 300; 174/138 J; 219/536, 541; 339/220 R, 131

[56] References Cited

U.S. PATENT DOCUMENTS

| | | | |
|---|---|---|---|
| 2,909,354 | 10/1959 | Bingham | 248/316 D |
| 2,958,020 | 10/1960 | Eannarino | 248/316 D |
| 2,995,795 | 8/1961 | Samson | 248/316 D |
| 3,143,214 | 8/1964 | Moore et al. | 211/26 |
| 3,921,253 | 11/1975 | Nelson | 248/300 |
| 4,032,209 | 6/1977 | Rutkowski | 339/91 R |
| 4,168,423 | 9/1979 | Gilreath | 219/536 |
| 4,395,586 | 7/1983 | Eiermann | 248/201 |

FOREIGN PATENT DOCUMENTS

1214293 4/1964 Fed. Rep. of Germany .
267511 3/1950 Switzerland .

*Primary Examiner*—William H. Schultz
*Assistant Examiner*—Ramon O. Ramirez
*Attorney, Agent, or Firm*—Roger H. Criss

[57] ABSTRACT

An arrangement is disclosed for affixing the longitudinal end portions of the mounting flange of rectangular electrical connectors or the like to the outer surface of a support panel adjacent opposite edges of an aperture in the panel. A spring metal clip is provided having a U-shaped clasping portion for engaging the front and rear surfaces of the support panel adjacent an edge of the aperture. Spring fingers integral with the clip lie adjacent opposite side edges of the clip and are spaced apart such as to springingly engage inwardly directed recesses in the longitudinal side surfaces of the mounting flange when the flange is positioned between the fingers. There is also provided a manually operated releasable clamp member integral with that extremity of the clip most remote from the edge of the aperture when the clasping portion of the clip engages the panel. The clamp member springingly engages and releasably clamps a portion of the outer surface of the mounting flange when the flange is fully engaged by the spring fingers. The mounting flange and clip are thereby substantially restrained from moving relative to one another in all directions and also relative to the panel.

10 Claims, 4 Drawing Figures

MOUNTING MECHANISM FOR FLANGED ELECTRICAL MODULES AND THE LIKE

BACKGROUND OF THE INVENTION

1. Field of the Invention

This invention relates to mounting mechanisms for mounting electrical modules or the like having mounting flanges on their peripheries to spaced apart support members and more particularly, to a spring mounting clip for fastening the mounting flange of an electric connector to the sides of an opening in a support panel or chassis.

2. Description of the Prior Art

In the fabrication of electrical and electronic equipment, it is often desired to fasten electrical modules or components, such as connectors, switches, potted IC circuits and the like to support panels or chassis.

More specifically, in cases where the module is provided with a housing having an attached integral peripheral mounting flange, the module may be supported within an aperture in a panel by fastening end portions of the flange to the panel material adjacent the periphery of the panel aperture.

Various forms of spring clips have been devised for aiding in the fastening of such flanges to the panel material. Typically, these clips have a clamp portion which springingly engages the front and rear surfaces of a panel adjacent a mounting aperture. After the clamp has been affixed to the panel, fingers extending from the clips engage certain surface portions of the module mounting flange to provide some degree of restraint to the movement of the module relative to the panel after the mounting flange of the module has been put into place between the fingers.

Such prior art spring clips, if not supplemented by conventional fasteners, such as screws, or bolts, or the like, acting through aligned holes in the flange and panel generally do not provide sufficient restraint to a connector mounted in this fashion under the influence of forces associated with the mating and particularly, the unmating of the connector with a complementary connector part. If the aperture is not sized within close tolerances, a connector may move out of or away from the clamping fingers to an extent that it becomes detached from the panel or other support member.

SUMMARY OF THE INVENTION

The present invention obviates the aforesaid disadvantages of prior art spring clip mounting clips by providing a spring mounting clip construction which securely engages the mounting flange of an associated module in a manner preventing any substantial movement of the module relative to the clip, and hence, to a support panel to which the clip is attached in all directions under normal use. This, in turn, obviates the need for ensuring that the dimensions of the aperture in the support panel be held to close tolerances.

More specifically, in accordance with the present invention, a mounting clip is provided which is made of spring material and having a U-shaped clasping portion for engaging the front and rear surfaces of a support member at an edge of the member. Spring fingers integral with the clip extend substantially perpendicularly to the outer surface of that part of the clasping portion which is designated to abut the front surface of the support member when it is clasped thereon. The fingers lie adjacent opposite side edges of the clip and are spaced apart such as to springingly engage inwardly directed recesses in the longitudinal side surfaces of a rectangular connector mounting flange when the flange is positioned between the fingers. There is also provided a manually operated releasable clamp member integral with that extremity of the clip most remote from the edge of the support member when the spring portion of the clip is engaged thereon. The clamp member springingly engages and releasably clamps a portion of the outer surface of the mounting flange when the flange is fully engaged by the aforesaid spring fingers. The clamping is effected adjacent the longitudinal end extremity of the flange whereby the clip and the mounting flange are substantially restrained from moving relative to one another in all directions.

DESCRIPTION OF THE PREFERRED EMBODIMENT

Figure 1:
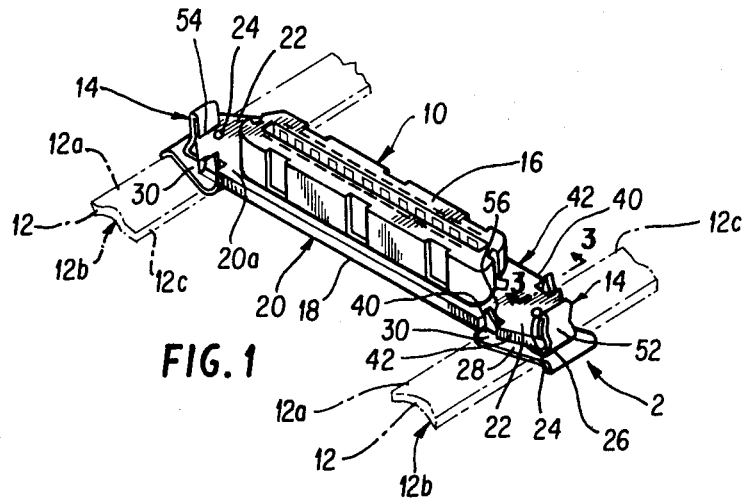
FIG. 1 is a perspective view of an electrical connector module having a mounting flange fastened to two support members through the use of spring clips constructed in accordance with the present invention.

Referring now to the drawings in greater detail and firstly to FIG. 1, a conventional electrical module, generally designated by the arrow 10, is shown supported upon and between two support members 12 by means of two identical mounting clips 14 constructed in accordance with the present invention. The module 10 by way of example may be an electrical connector having a mating end 16 and a conductor termination end 18. The connector or module 10 may be of the 157 Series type manufactured by Amphenol, an Allied Company. The mating end 16 is shown as having a plug type housing typically holding female contacts adapted to mate with a complementary connector module (not shown) having male contacts supported within a receptacle type housing. Electrical conductors (not shown) may be affixed to the tails of the contacts within connector 10 at the termination end 18 of the connector.

The two support members 12 are shown in phantom in order to better illustrate the constructional features of the mounting clips 14 which constitute an embodiment of the present invention. The support members 12 may be part of a rack and panel assembly for mounting electrical componentry. Alternatively, the support members 12 may be considered to represent opposite side portions of a panel or chassis in which an aperture has been cut (the other peripheral portions of such an aperture not being shown).

The connector or module 10 is typical of many electrical components in the sense that it is provided with a mounting flange 20 having two substantially identical end portions 22. The end portions 22 are provided with holes 24 therein to permit the conventional fastening of the flange 20 to the front surfaces 12a of support members, such a member 12 by means of conventional fasteners (not shown) passing through the holes 24 and corresponding holes (not shown) in the support members. Generally, some form of nut is then affixed to such fasteners on the rear sides 12b of the support members. When so mounted, the termination end 18 of the connector runs longitudinally between the two edge surfaces 12c of the support members 12.

It will be appreciated that the mounting of the module in the aforesaid conventional way involves the careful and accurate drilling or punching of holes in the support members and the dexterious positioning and tightening of fasteners. Moreover, should it be desired to exchange the module 10 with a different module having the same mounting flange dimensions or adjust the position of the existing module, the aforesaid labor intensive mounting procedure must be repeated.

Figure 2:
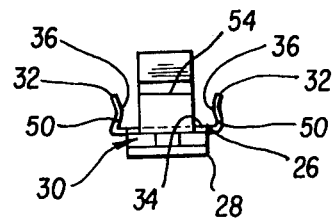
FIG. 2 is an end view of the mounting clip shown in FIG. 1 adjacent the arrow 2 and looking in the direction of that arrow.
Figures 3, 4:
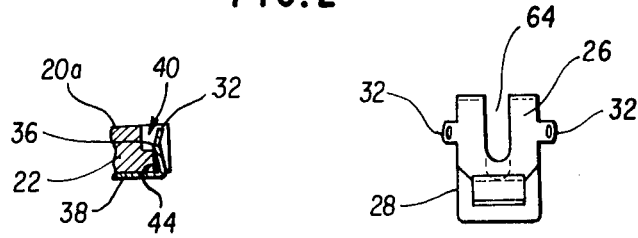
FIG. 3 is an enlarged cross-sectional view of a portion of the assembly shown in FIG. 1 taken at a plane defined by the lines 3—3 and looking in the direction of the arrows.
FIG. 4 is a plan view of the mounting clip shown in FIG. 2.

However, in accordance with the present invention, the mounting of the module or the connector 10 may be accomplished simply through the use of the aforementioned mounting clip 14 shown in more detail in FIGS. 2 through 4.

The mounting clip 14 is preferably made from a single elongated strip of relatively thin, flat, spring material such as tempered spring steel with a thickness, for example, ranging from 0.018 inches (0.4572 millimeters) to 0.025 inches (0.6350 milimeters). A first section 26 of the strip is reversely bent back over a second section 28 of the strip such that a major portion of each section lies essentially in one of two spaced apart planes substantially parallel to one another to form a clasp portion of the clip generally indicated by the reference numeral 30 and best seen in FIG. 2. The resulting configuration of these two sections is similar to a solid letter "U" with each section forming a respectively different leg of the U. The spacing between the sections is established such that the first and second sections will springingly engage and firmly clasp the front and rear surfaces 12a and 12b, respectively, of the support member 12 along its edge 12c with the edge positioned within the clasp portion and adjacent the base of the "U".

As best seen in FIG. 1 and FIG. 2, the first section 26 of the strip is provided with two substantially identical gripping fingers 32 integral with the strip and formed adjacent respective opposite longitudinally running edges of the strip. Each finger extends substantially perpendicularly from the outer surface 34 of the first strip section 26, both fingers lying along a line substantially parallel to the base of the "U" defined by the clasping portion 30 of the clip.

With specific reference to FIGS. 2 and 3, it can be seen that each of the fingers although extending generally perpendicularly to the outer surface 34 of the strip is inwardly bent as shown at 36 toward the other finger and spaced relative thereto so as springingly engage a flat inwardly 20a of flange 20 (FIG. 3) of a respective one of two recesses 40 located in the logitudinally running side surfaces 42 of an end portion 22 of the mounting flange 20. Such recesses are commonly provided in Telecommunication connectors for the purpose of mounting accessory devices, such as cable clamps, to the housing. The fingers also engage an outwardly facing surface 44 (FIG. 3) within the recesses 40 which is generally parallel to the adjacent side surface 42 of the flange and perpendicular to flange upper surface 20a.

As a consequence, when an end portion of the mounting flange 20 is positioned between the two fingers 32, the flange is restrained from lateral and vertical movement relative to the fingers. The inwardly bend portions 36 of the fingers engaging both the surface 38 and the surface 44 formed within each of the recesses 40. Essentially, the surface 44 may be considered a recessed continuation of said surface 42 of the mounting flange, whereas the surface 38 may be considered a recessed continuation of the upper surface 20a of the flange.

It is important to note, as can be best appreciated by reference to FIGS. 1 and 2, that the edge surface 50 of each finger 32 acts to restrain the mounting flange from being longitudinally displaced from the mounting clip 14 in a direction toward the opposite mounting clip. Therefore, the distance or dimension between the two edge surfaces 12c of the support members 12 is not critical and may be established within very loose tolerances depending upon the depth of the "U" defined by the clasping portions 30 and still provide secure support for the connector 10. For larger allowable separations between the two support member edge surfaces 12c, the connector will have adequate support and suffer no chance of being pulled away and separated from either support member as long as each edge surface 12c is embraced by the clasping portion 30 of one of the two clips 14. To assist in the assembly of the mounting flange 20 to the clip 14, the upper end extremities of the fingers 32 may be chamfered as best seen in FIG. 1, such that a cam surface 56 of each finger faces in a direction generally toward the clamp member 52.

In addition to the recesses 40 in conjunction with fingers 32 providing means for restraining longitudinal movement of the module 10 relative to the clip 14, the downwardly stepped flat inward surface 38 of the recesses 40 permit a reduction in the extent, if any, to which the fingers 32 must extend above the upper surface 20a of the module mounting flange 20 to securely retain the module. This, of course, reduces the possiblity of the fingers 32 interfering with the mounting on the end portions 22 of flange 20 of accessory devices of interfering with the mating of the connector 10 with a complementary connector.

In the preferred embodiment of the present invention shown in FIG. 1, the clip 14 is also provided with a clamp member 52 to further restrain the mounting flange 20 and its associated module 10 from being displaced from the clip 14 in a direction generally perpendicularly to the outer surface 34 (FIG. 2) of the first section 26 of the clip. The clamp member 52 is integral with the strip at the free extremity of the first section 26. This is accomplished by effecting a tight reverse bending of the strip comprising the first section 26 at its longitudinal extremity back upon itself in a direction generally toward the gripping fingers 32 and then downwardly toward the surface 34 of the first section such that the edge surface 54 (best seen in FIGS. 1 and 2) is substantially parallel to the outer surface 34 of the clamp first section 26. This end surface 54 is spaced from surface 34 such that the surface 54 will springingly engage and clamp the upper surface 20a of the mounting flange 20 when an end portion 22 of the flange is forced into retention by the clip by pressing the flange against surface 32 of the clip. This is best achieved by aligning the fingers 32 with the recesses 40 and then pressing the mounting flange toward the surface 34 of the clip. The clamp member 52 having a tapered surface facing the module will yield and allow the end extremity of the clip to become restrained by the clamp end surface 54.

To remove the mounting flange from the clip, the upper extremity of the clamp member 52 may be manually displaced in a direction away from the fingers 32.

With the use of a clip in accordance with the present invention, it is not necessary in most instances to employ any other means for securing a module such as 10 to support member such as 12. The restraining action of gripping fingers 32 taken in combination with the restraining action of the clamp member 52 is generally adequate to accommodate the maximum forces encountered in the mating and particularly, the unmating of telecommunication type connectors. Additionally, enough frictional restraint may be provided between the clip 14 and support members such as 12 to permit the module to be moved to and fro along the upper surfaces 12a of the support members 12 to any desired position which once reached the clasp portion of the clip will maintain the module at that position.

However, if after perhaps experimentally positioning a number of modules adjacent one another between two support members it is desired to ridgidly secure a clip to a support member, this may be done with the aid of conventional fastener acting through the aperture 64 (see FIG. 4) formed in the clip.

It will be understood that the invention described hereinabove may be embodied in other specific forms without departing from the spirit of central characteristics thereof. Present example and embodiment therefore is to be considered in all respects as illustrational and not restrictive and the invention is not to be limited to the details given herein but only in accordance with the appended claims when read in the light of the foregoing specification and attached drawings.

What is claimed is:

1. A mounting clip made of spring material and having a U-shaped clasping portion for engaging the front and rear surfaces of a support member at an edge of said member, first and second opposed spring fingers integral with said clip extending substantially perpendicularly to the outer surface of that part of said clasping portion which is designated to abut the front surface of said support member, said fingers lying adjacent opposite side edges of said clip and spaced apart such as to springingly engage inwardly directed recesses in the longitudinal side surfaces of a rectangular connector mounting flange when positioned between said fingers, and a manually operated releasable clamp member integral with that extremity of said clip most remote from the edge of a support member when said clamping portion is engaged thereon for springingly engaging and releasably clamping a portion of the outer upper surface of said mounting flange adjacent the longitudinal end extremity thereof when said spring fingers are engaged in said recesses whereby said clip and mounting flange are substantially restrained from movement relative to one another in all directions.

2. A clip according to claim 1 wherein said clip has an aperture formed therein permitting a fastener to be positioned therethrough for fastening the clip to a mounting member.

3. A clip useful in affixing the mounting flange of a rectangular electrical connector or the like for support by two spaced apart relatively thin substantially planar support members, each member having a front and an edge surface with the edge surface of one member being substantially parallel to and facing the edge surface of the other member, said mounting clip comprising:

an elongated strip of relatively thin, flat, spring material shaped and formed to provide, a clasp portion made up of a first and a second section of said strip longitudinally contiguous with one another and back over one another with the major portion of each section and lying in one of two spaced apart planes substantially parallel to one another such that said first section and second section correspond respectively to separate legs of a solid letter "U" with the spacing between said sections being such that said first and second sections will springingly engage and clasp the front and rear surfaces, respectively, of a support member along its edge with the edge positioned within and near the base of the "U", said first section having a first and a second gripping finger integrally formed adjacent respective opposite longitudinal edges thereof, each finger extending substantially perpendicularly from the outer surface of said first section in a direction away from said second section and lying along line substantially parallel to the base of the "U", each of said fingers being so shaped and spaced relative to the other as to springingly engage a flattened inwardly directed surface portion of a respective one of two recesses each located in different one of two exposed longitudinal sides of a rectangular connector mounting flange, said first section additionally having integrally formed at its extremity a manually releasable clamp finger formed by a tight reverse bending of the material comprising said first section at its longitudinal extremity back upon itself in a direction generally toward said gripping fingers and then down toward said second section such that the edge surface of the free extremity of said first section is substantially parallel to the outer surface of said first section, the spacing between said edge surface and the surface of said first section being such that said edge surface will springingly engage and clamp an exposed portion of the outer surface of the longitudinal end extremity of a rectangular connector mounting flange when held by said clip whereby the clip may be clasped onto a support member at an edge thereof and one end of a rectangular connector mounting flange pressed against said first surface of said clip to contemporaneously engage said recesses and restrain an end and two sided surface of the flange from movement in any direction relative to said support member.

4. In combination: a module having a relatively thin substantially rectangular mounting flange with an upper and a lower surface and two longitudinally extending side surfaces, said flange having an end portion at each longitudinal extremity thereof, each designated for affixation to one of two spaced apart plate-like support members, each member having a front and a rear surface and an edge surface running in a direction substantially parallel to the edge surface of the other member, and a mounting clip for affixing either of said module mounting flange end portions to one of said support members, said clip being made of spring material and having a U-shaped clasping portion having a first and a second leg for springingly engaging the front and rear surfaces, respectively, of a support member adjacent an edge surface thereof, said mounting clip having a manually releasable spring clamp member and a plurality of spaced apart blade-like spring fingers, said clamp member and fingers being integral with said first leg of said clasping portion and extending away therefrom in a direction generally perpendicuarly to said leg, said clamp member snugly engaging the upper surface of one of said mounting flange end portions to springingly urge said one end portion against said first leg with said fingers engaging both edge surfaces and inwardly facing surface elements of said end portion adjacent said edge surfaces to further springingly urge said flange and portion against said first leg.

5. In combination: a module having a relatively thin substantially rectangular mounting flange with an upper and a lower surface and two longitudinally extending side surfaces, said flange having an end portion at each longitudinal extremity thereof, each designated for affixation to one of two spaced apart plate-like support members, each member having a front and a rear surface and an edge surface running in a direction substantially parallel to the edge surface of the other member, and a mounting clip for affixing either of said module mounting flange end portions to one of said support members, said clip being made of spring material and having a U-shaped clasping portion having a first and a second leg for springingly engaging the front and rear surfaces, respectively, of a support member adjacent an edge surface thereof, said mounting clip having a manually releasable spring clamp member and a plurality of spaced apart blade-like spring fingers, said clamp members and fingers being integral with said first leg of said clasping portion and extending away therefrom in a direction generally perpendicularly to said leg, said clamp member snugly engaging the upper surface of one of said mounting flange end portions to springingly urge said one end portion against said 'first leg with said fingers snugly engaging portions of both side surfaces of the flange and means carried by said end portion for engaging upwardly extending side surface portions of said fingers to restrain movement of said flange in a longitudinal direction relative to said clip.

6. The combination according to claim 5 wherein said means comprises at least one notch in at least one side surface of said flange, said notch being dimensioned to receive one of said spring fingers.

7. The combination according to claim 6 wherein the free longitudinal end extremity of said fingers are chamfered to provide a sloped ramp surface generally facing said clamp member to aid in the positioning of a finger within a notch.

8. The combination according to claim 6 wherein the interior of said notch is provided with a stepped surface generally parallel to the upper surface of said flange and extending laterally there within and said finger engages both an internal longitudinally facing side surface of said notch and said stepped surface.

9. In combination: a module having a relatively thin substantially rectangular mounting flange with an upper and a lower surface and two longitudinally extending side surfaces, said flange having an end portion at each longitudinal extremity thereof, each designated for affixation to one of two spaced apart plate-like support members, each member having a front and a rear surface and an edge surface running in a direction substantially parallel to the edge surface of the other member, and a mounting clip for affixing either of said module mounting flange end portions to one of said support members, said clip being made of spring material and having a U-shaped clasping portion having a first and a second leg for springingly engaging the front and rear surfaces, respectively, of a support member adjacent an edge surface thereof, said mounting clip having a plurality of spaced apart blade-like spring fingers, said fingers being integral with said first leg of said clasping portion and extending away therefrom in a direction generally perpendicularly to said leg, said fingers engaging both edge surfaces and upwardly facing surface elements of said end portion adjacent said edge surfaces to springingly urge said flange end portion against said first leg.

10. In combination: a module having a relatively thin substantially rectangular mounting flange with an upper and a lower surface and two longitudinally extending side surfaces, said flange having an end portion at each longitudinal extremity thereof, each designated for affixation to one of two spaced apart plate-like support members, each member having a front and a rear surface and an edge surface running in a direction substantially parallel to the edge surface of the other member, and a mounting clip for affixing either of said module mounting flange end portions to one of said support members, said clip being made of spring material and having a U-shaped clasping portion having a first and a second leg for springingly engaging the front and rear surfaces, respectively, of a support member adjacent an edge surface thereof, said mounting clip having a plurality of spaced apart blade-like spring fingers, fingers being integral with said first leg of said clasping portion and extending away therefrom in a direction generally perpendicularly to said leg, said fingers snugly engaging portions of both side surfaces of the flange and means carried by said end portion for engaging upwardly extending side surface portions of said fingers to restrain movement of said flange in a longitudinal direction relative to said clip.

* * * * *